Dec. 2, 1924.
M. V. STROHSCHEIN
1,517,264
MEANS FOR INDICATING UNAUTHORIZED USE OF MOTOR VEHICLES
Filed Dec. 5, 1923
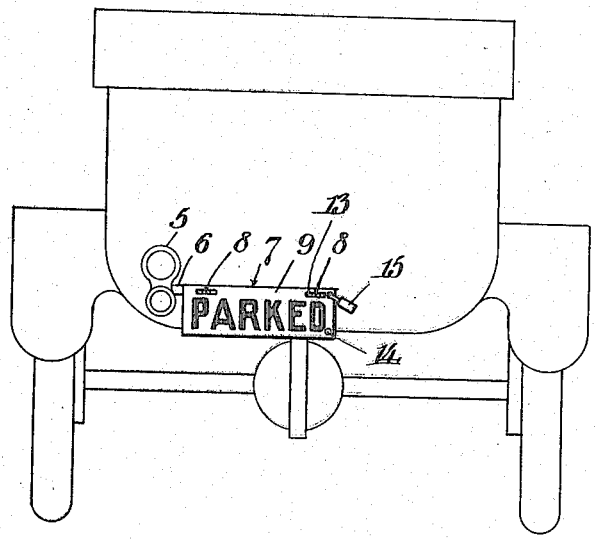
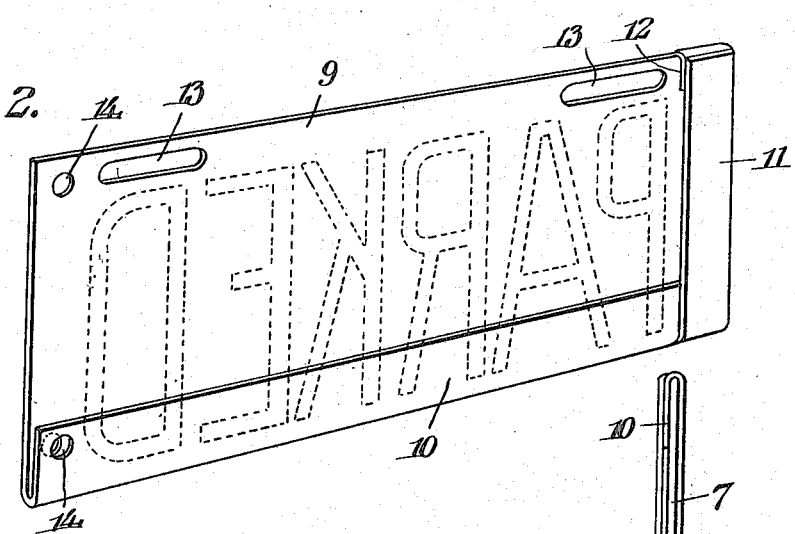
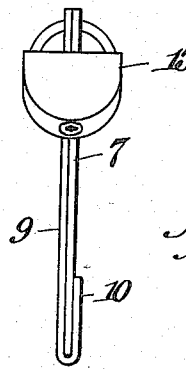
Inventor
Margaret V. Strohschein,
By
Attorney Patented Dec. 2, 1924.

1,517,264

UNITED STATES PATENT OFFICE.

MARGARET V. STROHSCHEIN, OF WEST NEW YORK, NEW JERSEY.

MEANS FOR INDICATING UNAUTHORIZED USE OF MOTOR VEHICLES.

Application filed December 5, 1923. Serial No. 678,705.

*To all whom it may concern:*

Be it known that I, MARGARET V. STROHSCHEIN, a citizen of the United States, and residing at West New York, New Jersey, have invented certain new and useful Improvements in Means for Indicating Unauthorized Use of Motor Vehicles, of which the following is a specification.

This invention relates to attachments for motor vehicles, and particularly to means for indicating the unauthorized use thereof.

The primary object of this invention is to provide means in connection with a motor vehicle to indicate that the same is being unauthorizedly used or stolen, with the view to eliminating or minimizing such practice, as well as the apprehension of those guilty of the offense.

A further object of the invention is to provide indicating means capable of easy application to the vehicle, and yet which may not be readily removed therefrom.

A still further object of the invention is to provide a device of the character stated which is of simple construction; which may be manufactured and retailed at small cost; which is applicable with equal facility to all kinds or types of motor vehicles; which requires no mechanical skill or special tools or equipment in properly applying the same to the vehicle; which requires no alteration of the vehicle or preparation for applying the same; which cannot become accidentally displaced or removed from the vehicle, and which will prove thoroughly practical and efficient in use.

With these objects in view, together with others which will appear as the description proceeds, the invention consists in the novel construction, combination and arrangement of parts, all as will be described more fully hereinafter, illustrated in the accompanying drawings, and more particularly pointed out in the claims.

In the drawings:

Fig. 1 is a rear elevation of a conventional type of motor vehicle, and illustrating as applied thereto an indicating device constructed and arranged in accordance with the invention, Fig. 2 is an enlarged rear perspective view of the indicating plate removed from the vehicle, Fig. 3 is an edge view of the plate, and showing the means whereby the same is applied to the license plate of a motor vehicle, and Fig. 4 is a similar view of a slightly modified form of the invention.

Referring now more particularly to the drawings, 5 indicates the usual tail light of the vehicle, having an arm 6 thereon to which is attached the usual license plate 7. The latter, as is well known, is of a certain size, and the license plates of the several States are usually the same size and construction and are applied to vehicles in the same manner. Each of these plates is provided near its upper and lower edges with slots and openings for the reception of securing bolts or screws, as indicated at 8 in the drawings, so that the plates may be fastened to the bracket or arm upon the vehicle.

The device of my invention consists of a plate adapted to cover and obscure the license plate, and having printed or inscribed thereon wording indicative of the unauthorized use of the vehicle. The cover plate for the license tag is indicated at 9, and consists of a flat metallic sheet equal in length and breadth to the license tag. The outer surface of this plate may be suitably or appropriately inscribed; in this instance it has printed thereon Parked, suggesting to an observer that if in motion the vehicle is being moved without authorization of the owner. Any other suitable wording may be employed.

The plate 9 is provided near one of its longitudinal edges with an inturned flange 10, coextensive preferably with the plate and adapted to engage with the corresponding edge of the license tag. One end of the plate is provided with an inturned flange 11 providing a pocket to receive the corresponding edge of the tag, and both of the ends of this pocket are closed.

The metal of which the cover plate is formed may be relatively heavy to protect it against tampering, and the meeting edges or portions of the flanges 10 and 11 may be secured together as desired, either by riveting or by welding. The outer end of the flange 11 is secured to an inturned portion 12 of the plate body, so that rigidity of the structure is assured.

The plate 9 is provided with slots 13 and openings 14 corresponding in number, size and location with the slots and openings in the license tag, and which are to register with the tag openings when the cover plate is applied to the tag.

In applying the cover plate to the tag, one end thereof is engaged in the pocket formed by the flange 11 at one end of the cover plate, and the latter is moved so as to exactly overlie the tag. This will bring the flange 10 over the next adjacent longitudinal edge of the tag and the openings and slots of the tag and plate will be in alinement with each other. The shackle of a lock 15 may be passed through a pair of these alined openings and the lock closed. The plate will in this manner be held securely in proper position upon the tag; covering the license number thereof, and displaying prominently its inscription. The pocket at one end of the plate will limit the movement of the plate in one direction, while the flange 10 will prevent its movement in a lateral direction. The shackle of the lock will hold the outer edges of the tag and plate together in proper matched relation, and against accidental displacement or unauthorized removal.

In some instances, the plate 9 may be formed with its pocket at one end and the longitudinal flange along a certain edge, while in other instances the pocket may be arranged at the opposite end and the flange along the other edge of the plate, as shown in Fig. 4 of the drawings. The invention is not limited to the exact location and arrangement of these parts, as they may be differently located if deemed necessary or advisable. It will be understood, furthermore, that variations in the size of the cover plates, the construction of the flanges or fingers, the pocket, and the number, size and location of the slots and openings, may be changed without departing from the spirit of the invention as defined by the claims.

Having thus described my invention, I claim:

1. In a device of the class described, the combination with a license tag having the usual openings therein, of a cover plate for said tag having openings to register with the openings in said tag, flanges on certain edges of said cover plate extending at right angles to each other to engage with the corresponding edges of the tag, and locking means to be engaged in certain of the registered openings of said tag and cover plate.

2. In a device of the class described, the combination with the license tag of a vehicle, of a cover plate corresponding in size and shape with said tag and adapted to cover the latter, a pocket at one end of said cover plate adapted to receive one end of said tag, a flange along one longitudinal edge of said plate adapted to enclose the corresponding edge of the tag, and means for locking the plate to said tag.

3. In a device of the class described, a plate, a flange at one longitudinal edge of said plate, a flange at one end of said plate forming a pocket closed at both ends, and joining said longitudinal flange, and the said plate having openings therein.

4. In a device of the class described, a plate, a closed pocket at one edge of said plate, a flange on another edge of said plate disposed at right angles to said pocket, and means remote from said flange and pocket whereby said plate may be secured to a support.

In testimony whereof I affix my signature.

MARGARET V. STROHSCHEIN.